United States Patent [19]
Kisters et al.

[11] 4,208,383
[45] Jun. 17, 1980

[54] PROCESS AND APPARATUS FOR THE ABSORPTIVE REMOVAL OF POLLUTANTS FROM WASTE GASES

[75] Inventors: Theodor Kisters; Alfred Vogler, both of Krefeld, Fed. Rep. of Germany

[73] Assignee: Babcock-Bsh Aktiengesellschaft Vormals Bütner-Schilde-Haas AG, Krefeld, Fed. Rep. of Germany

[21] Appl. No.: 939,373

[22] Filed: Sep. 5, 1978

[30] Foreign Application Priority Data

Sep. 2, 1977 [DE] Fed. Rep. of Germany ....... 2739509

[51] Int. Cl.² ............................................. B01D 53/34
[52] U.S. Cl. .................................. 423/215.5; 423/210; 423/232; 423/234; 423/240; 423/241; 423/242; 422/111; 422/169
[58] Field of Search ............... 423/210, 232, 234, 240, 423/241, 242 A; 422/105, 110, 111, 120, 169, 171, 215.5

[56] References Cited

U.S. PATENT DOCUMENTS

| | | | |
|---|---|---|---|
| 2,231,309 | 2/1941 | Weber | 423/241 |
| 2,895,800 | 7/1959 | Otto | 422/168 X |
| 3,958,961 | 5/1976 | Bakke | 55/118 |
| 3,969,482 | 7/1976 | Teller | 423/242 A |
| 3,989,465 | 11/1976 | Onnew | 422/110 |
| 4,006,066 | 2/1977 | Sparwald | 422/168 X |
| 4,019,444 | 4/1977 | Kleeberg et al. | 422/169 |
| 4,039,304 | 8/1977 | Bechthold | 423/242 A |
| 4,164,547 | 8/1979 | Simko | 423/242 |

FOREIGN PATENT DOCUMENTS

1333635  10/1973  United Kingdom ................... 423/210

*Primary Examiner*—Earl C. Thomas
*Attorney, Agent, or Firm*—Michael J. Striker

[57] ABSTRACT

Waste gases are purged by adding to the gas while it flows through an absorber a neutralizing agent together with water and then subjecting the gas to cooling so as to evaporate the added liquid. The adsorption then results in a reaction with the neutralizing agent whereby dry salts are formed which are removed from the process. The temperature of the waste gas is automatically and continuously measured and the volume of the water is adjusted automatically and continously in accordance with the temperature measurements. The amount of waste gases is furthermore automatically and continuously measured, preferably at several places of the process, and the amount of neutralizing agent is continuously and automatically adjusted to the latter measurements so as to obtain always the stoichiometric equivalent for the reaction with the pollutants.

4 Claims, 2 Drawing Figures

PROCESS AND APPARATUS FOR THE ABSORPTIVE REMOVAL OF POLLUTANTS FROM WASTE GASES

BACKGROUND OF THE INVENTION

The invention relates to a process for the removal by absorption of noxious compounds from waste gases, particularly gases generated by the combustion of industrial or domestic wastes.

For this purpose several processes are known which either operate with dry or with wet residues.

The wet residue processes require additional purification steps since the waste water formed connot readily be recycled into the fresh water channel. These processes therefore involve substantial additional apparatus which again increases the cost of the process.

The processes operating with dry residues either apply finely ground absorbents in dry condition to the gas or spray-inject a neutralizing agent together with water into the waste gas flow or establish the contact in some other way.

It is for instance known from German published application No. 2,518,079 to spay-inject a neutralizing agent with water into the waste gas stream and then to subject the gas stream to chilling in order to form dry salts. The volume of the injected water is determined on the basis of the flow rate and the temperature of the waste gas which heats up and causes its evaporation. The concentration of the neutralizing agent in the water is such that the neutralizing agent is present in amounts which at least are equivalent to the stoichiometric amount necessary for reacting with all of the noxious gases.

In view of the continuous changes in operating conditions continuous adjustments are necessary to comply with the specific conditions. These adjustments are costly and are normally effective only with a certain phase lag. An economically optimum and at all times satisfactory absorption of the pollutions is not assured thereby.

It is therefore an object of the present invention to obtain an adjustment of the injected water and of the added neutralizing agent in a continuous manner and without a phase lag and in accordance with the conditions prevailing at any moment of time and thus to obtain a uniform quality of the purified gas while minimizing the amount of necessary neutralizing agent.

SUMMARY OF THE INVENTION

This object is solved in the invention by a continuous and automatic measurement of the concentration of the components in the gas and causing the amount of neutralizing agent to become adjusted automatically and continuously dependent on these measurements of the gas concentration so as to always have present the stoichiometric amount of neutralizing agent in the gas. In a further feature of the invention the temperature of the gas discharged from the absorber is also subjected to a continuous automatic measurement and the amount of recycled water is continuously and automatically adjusted dependent on these temperature measurements so as to add to the gas a temperature-related amount of water in order to keep the temperature in the absorber constant.

Preferably the concentration of pollutants is measured at several places, preferably prior and directly behind the absorber and after discharge from a filter arranged behind the absorber.

The formed dry salt can be passed into the filter and eliminated therein. The chemical reaction which is started in the absorber may continue in the connecting channel from the absorber to the filter and in the filter itself subsequent to discharge of the gas from the absorber.

To assure a perfect liquid spray under all conditions it is preferable not to change the added amount of fresh water. The adjustment rather is obtained by adjusting the water that is recirculated into the water inlet channel or water supply vessel.

Preferably, measuring devices for the gas concentration are provided in several places, for instance in the channel introducing the waste gas to the absorber, in the connecting channel between the absorber and the subsequent filter and in the outlet through which the purified gas is discharged from the filter. All these measuring devices may be connected to a central control arrangement.

The principal acidic pollutants to which the present process applies are sulfur dioxide and halogen acids, such as, hydrogen chloride and hydrogen fluoride. The neutralizing agents are preferably sodium hydroxide and calcium hydroxide.

The process may, however, also be useful to remove carbonic acid ($CO_2$), chlorine and other noxious components from the gases.

The neutralizing agents generally are alkali or alkaline earth oxides or hydroxides, carbonates and bicarbonates, for instance, alkali compounds of sodium, potassium or lithium.

The elemination of the formed salt particles may be effected by a gravity separator or a filter. The latter is preferable as will be discussed below.

The amount of neutralizing agent is supplied from various supply vessels by means of a dosage device which may be connected with a central control device. Preferably, a temperature adjustment device is provided in the connecting channel from the absorber to the subsequent filter, which device controls a valve in the water recycling channel.

The connecting channel between the absorber and the filter may also constitute a further absorption channel.

The addition of neutralizing agents and water to the absorber preferably is effected by separate inlet ducts.

The nozzles for effecting the spray-injection of the water can be distributed in the absorber peripherally in the neighborhood of the waste gas inlet channel, and they may be interconnected by an annular duct. Preferably, the nozzles are arranged peripherally in a manner that the distribution of the spray-injected water corresponds to the flow speed profile of the introduced waste gas.

The nozzles are preferably in the form of two-way nozzles for introducing and recycling the water.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILS OF THE INVENTION AND PREFERRED EMBODIMENTS

Figure 1:
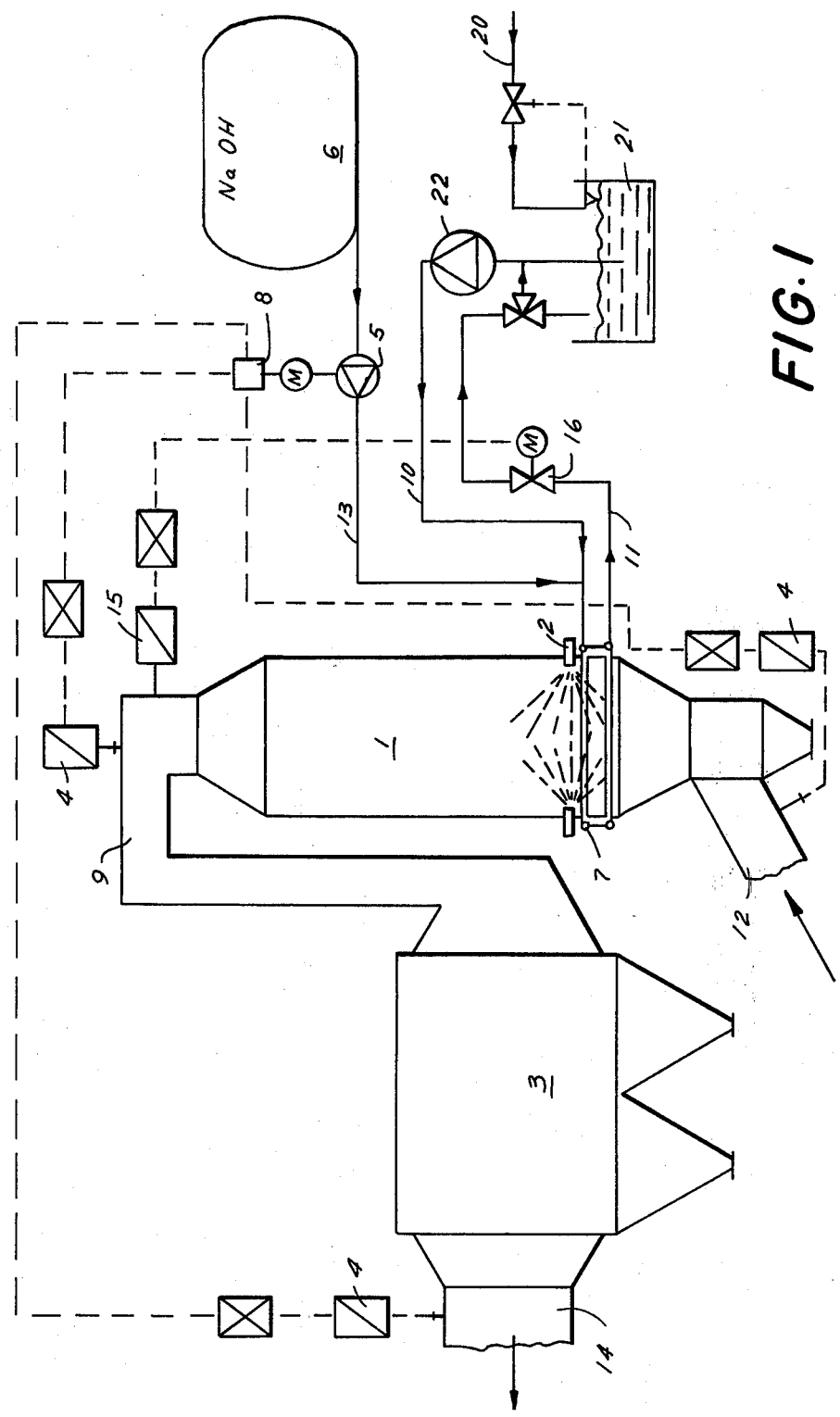
FIG. 1 illustrates, in a diagrammatic manner and partly in the form of a flow sheet, the inventive process and apparatus in which sodium hydroxide is used as the neutralizing agent.

With reference in the first place to FIG. 1 it will be seen that the waste gas is introduced into the absorber 1 through an introductory channel 12. Above this inlet channel there are provided peripherally in the absorber two-way nozzles 2 which are interconnected by an annular duct 7.

Around each nozzle 2 a ring of air currents is formed which prevents interference with the operation by adhesions or excessive temperatures. Instead of the separate recycling channel it is also possible to use two-way nozzles in which the liquid spray is formed by means of compressed air.

The concentration of pollutants is measured by gas analysis apparatus 4 of which are provided: one in the waste gas introductory channel 12, another in the connecting channel 9 from the absorber 1 and a third one in the discharge channel 14 for the purified gas from the electrofilter 3. All these measuring devices are connected to a common central control device 8.

Figure 2:
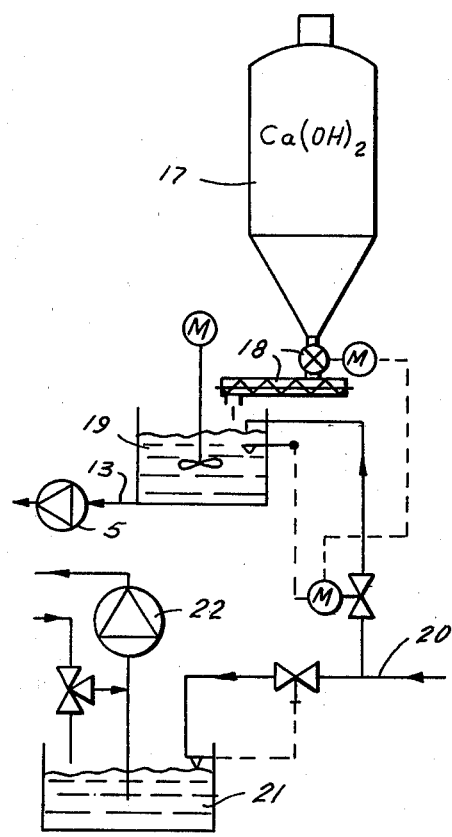
FIG. 2 is a partial view of another embodiment in which milk of lime is used as the neutralizing agent.

As already indicated the neutralizing agent may be sodium hydroxide or milk of lime. As appears from FIG. 1 the sodium hydroxide is obtained from a supply tank 6. FIG. 2 illustrates the use of calcium hydroxide. The lime is disposed in a silo 17 and is passed through suitable distribution and conveyance means 18 to a stirring tank 19 where further water is added to form milk of lime.

The sodium hydroxide or milk of lime is passed into the absorber through the duct 13 from the supply tanks 6 and 19. The injection is effected by means of a dosage pump 5. The regulation of the amount is carried out through the dosage pump depending on the results obtained from the measurements in the gas analyzers 4 and evaluated by the central control device 8, such as a computer.

In the connecting channel 9 a temperature regulator 15 is provided which is conected with a valve 16 disposed in the water recycling duct 11.

For injecting the sodium hydroxide or milk of lime and fresh water into the absorber, a separate alkali inlet 13 and water inlet channel 10 are provided. The fresh water duct is indicated at 20; it leads to a water supply tank 21 from which the inlet channel 10 is fed. This is accomplished by a pump 22. The pump is adjusted to supply a constant amount of liquid from the tank 21.

The regulation of the volume of the injected water accordingly is effected exclusively by means of the water recycling duct 11 by means of the valve 16 which in turn is controlled by the temperature regulator 15. The recycling water can be introduced directly into the inlet channel 10 of the water or into the water supply tank 21.

The absorber 1 as shown in the drawing is a vertical structure and the upwards flowing gas reacts with the sodium hydroxide or milk of lime to form salts which in dry form are passed with the gas through channel 9 into the connected electrofilter 3 where the separation is effected. Chemical reactions started in the absorber may thus continue in the connecting channel 9 and in the electrofilter 3.

The process of the invention and the apparatus for carrying it out permits a speedy automatic adjustment to the conditions existing at any moment of time, principally to the varying concentrations in the gas volume. This assures that even at peak charges of waste gas the desired results are obtained. Besides, the process and apparatus permit minimizing the amount of the sodium hydroxide or milk of lime while at the same time obtaining an optimum absorption of pollutants from the waste gases.

It will be understood that other neutralizing agents may also be used in the process of the invention.

It is also noted that the process in addition to other advantages accomplishes a better conditioning and thus an improved dust separation in the electrofilter.

The measuring device for the concentration of the various pollutants or noxious gases in the waste gas may be in form of a conventional device adapted to measure the continuous changes in the concentration of noxious gases, particularly in case of waste combustion installations since the composition of the waste products of course is subject to great variation. The concentrations of the noxious gases are concurrently measured as indicated above and then further processed by a computer which directly calculates the necessary amount of neutralizing agent which must be introduced into the absorber.

The devices for carrying out these measurements may be conventional gas analysis apparatus, particularly of the type that operates by means of absorption spectrum analysis. In these devices as is commonly known the differential absorption properties of the various noxious gas components are determined relative to ultra-violet or infrared ray absorption.

A device of this kind is for instance on the market under the tradename "EDZ device" and is made by the Philips Corporation of Eindhoven, Holland.

The following example will further illustrate the invention.

EXAMPLE

This example specifically relates to an apparatus for use in connection with a combustion installation for domestic or industrial wastes. The total amount of waste gas introduced into the absorber in this case was 100,000 $Nm^3$ per hour (the term $Nm^3$ as usual designating a normal cubic meter, that is a cubic meter at zero temperature C. and a pressure of 1,000 millibar).

The flue gas temperature of the gas at the point of introduction was 280° C.

The composition of the waste gas included the following components:

HCl—2,000 $mg/Nm^3$
$SO_2$—1,000 $mg/Nm^3$
HF—30 $mg/Nm^3$
flue dust—10 $g/Nm^3$ All of these measurements relate to the components in dry condition.

The amount of water injected into the adsorber for the purpose mainly to lower the temperature was 4,488 kg/h. The neutralizing agent in the form of sodium hydroxide was used in an amount of 430 kg/h.

Upon discharge from the apparatus the temperature of the gas had been reduced from 280° C. to 180° C. The total solid contents of the purified gas upon discharge, that is the contents of flue dust plus salts plus alkali carbonates, amounted to a maximum of 100 mg/Nm$^3$ measured again in dry condition.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for purging hot waste gas from pollutants including HCL, SO$_2$, HF and flue dust comprising the steps:
   (a) passing the waste gas into an absorber and injecting a neutralizing agent consisting of sodium hydroxide or calcium hydroxide in the form of a dispersion or aqueous suspension or solution into said absorber;
   (b) injecting together with said neutralizing agent water in such an amount into said absorber that the water will completely evaporate while cooling said waste gas and said neutralizing agent will react with said pollutants to form dry salts therewith;
   (c) passing the gas from said absorber through a filter to separate said dry salts from the gas;
   (d) continuously measuring the concentration of said pollutants in said waste gas at a location upstream of the injection of water and neutralizing agent into said absorber and at a location upstream and downstream of the separation of said dry salts from said waste gas;
   (e) automatically and continuously adjusting the amount of neutralizing agent injected into said absorber depending on the measuring of the concentration at said three locations so as to always react at least a stoichiometric amount of neutralizing agent with said gas;
   (f) continuously measuring the temperature of the gas between said absorber and said filter; and
   (g) continuously and automatically adjusting the amount of injected water in dependence on the measured temperature of the gas.

2. The process of claim 1 wherein the neutralizing reaction (b of claim 1) is continued after discharge of the gas from the absorber and while the gas moves into the filter and passes through the filter.

3. A process as defined in claim 1, wherein said step of continuously and automatically adjusting the amount of injected water comprising feeding a constant amount of water to the absorber and regulating the amount of water injected into said absorber by bypassing part of the constant amount of water before it is injected into said absorber and regulating the amount of bypassed water in dependence on the measured temperature.

4. A process as defined in claim 3, wherein the constant amount of water is taken from a water supply, and wherein said bypassed water is fed back to said water supply.